United States Patent
Yasunaga

(10) Patent No.: US 12,264,259 B2
(45) Date of Patent: *Apr. 1, 2025

(54) COATING AGENT FOR OIL SEAL

(71) Applicant: NOK CORPORATION, Tokyo (JP)

(72) Inventor: Natsumi Yasunaga, Fukushima (JP)

(73) Assignee: NOK CORPORATION, Tokyo (JP)

(*) Notice: Subject to any disclaimer, the term of this patent is extended or adjusted under 35 U.S.C. 154(b) by 616 days.

This patent is subject to a terminal disclaimer.

(21) Appl. No.: 17/629,529

(22) PCT Filed: Jun. 30, 2020

(86) PCT No.: PCT/JP2020/025687
§ 371 (c)(1),
(2) Date: Jan. 24, 2022

(87) PCT Pub. No.: WO2021/014901
PCT Pub. Date: Jan. 28, 2021

(65) Prior Publication Data
US 2022/0251419 A1    Aug. 11, 2022

(30) Foreign Application Priority Data

Jul. 25, 2019  (JP) ................. 2019-136650

(51) Int. Cl.
| | | |
|---|---|---|
| *C09D 7/65* | (2018.01) | |
| *C09D 7/20* | (2018.01) | |
| *C09D 7/40* | (2018.01) | |
| *C09D 109/00* | (2006.01) | |
| *C09D 191/06* | (2006.01) | |
| *F16J 15/3284* | (2016.01) | |

(52) U.S. Cl.
CPC ............ *C09D 191/06* (2013.01); *C09D 7/20* (2018.01); *C09D 7/65* (2018.01); *C09D 7/69* (2018.01); *C09D 109/00* (2013.01); *F16J 15/3284* (2013.01)

(58) Field of Classification Search
None
See application file for complete search history.

(56) References Cited

U.S. PATENT DOCUMENTS

| | | |
|---|---|---|
| 7,789,396 B2 | 9/2010 | Takeno et al. |
| 9,228,153 B2 | 1/2016 | Kunieda |
| 10,781,321 B2 | 9/2020 | Kimura et al. |
| 2009/0200750 A1 | 8/2009 | Takeno et al. |
| 2017/0283642 A1 | 10/2017 | Kimura et al. |
| 2017/0292037 A1 | 10/2017 | Kimura et al. |
| 2018/0030287 A1* | 2/2018 | Kimura ............... C09D 109/00 |

FOREIGN PATENT DOCUMENTS

| | | |
|---|---|---|
| CN | 108587404 | 9/2018 |
| EP | 3 199 583 A1 | 8/2017 |
| EP | 3 199 584 A1 | 8/2017 |
| EP | 3 272 820 A1 | 1/2018 |
| JP | 09-109703 | 4/1997 |
| JP | 3893985 B2 | 3/2007 |
| JP | 2007-332269 | 12/2007 |
| JP | 2008-189892 | 8/2008 |
| JP | 4873120 B2 | 2/2012 |
| KR | 10-2019-0023583 | 3/2019 |
| WO | 2016/132982 A1 | 8/2016 |

OTHER PUBLICATIONS

ISR issued in International Patent Application No. PCT/JP2020/025687, Sep. 24, 2020, translation.
Written Opinion issued in International Patent Application No. PCT/JP2020/025687, Sep. 24, 2020, translation.
IPRP issued in International Patent Application No. PCT/JP2020/025687, 019/25/2022, translation.

* cited by examiner

*Primary Examiner* — Sheeba Ahmed
(74) *Attorney, Agent, or Firm* — GREENBLUM & BERNSTEIN P.L.C.

(57) ABSTRACT

A coating agent for oil seal comprising 10 to 90 parts by weight in total of fluororesin particles having a particle size of 2 μm or less and filler particles other than fluororesin particles having a particle size of 0.5 to 30 μm, and 10 to 40 parts by weight of a wax having a melting point of 40 to 160° C., based on 100 parts by weight of isocyanate group-containing 1,2-polybutadiene, and being prepared as an organic solvent solution, wherein the fluororesin particles are used at a ratio of 20 to 80 wt. % of the total filler amount. The coating agent for oil seal can improve abrasion resistance while maintaining the roughness of a coating surface to which the coating agent is applied.

5 Claims, No Drawings

COATING AGENT FOR OIL SEAL

TECHNICAL FIELD

The present invention relates to a coating agent for oil seal. More particularly, the present invention relates to a coating agent for oil seal having excellent dispersibility for fillers.

BACKGROUND ART

Oil seal is widely used as an important machine element in the field of vehicles, industrial machines, and the like. Oil seal is used for the purpose of movement and sliding; however, in that case, deterioration of the seal oil and the sealing material due to the frictional heat of the seal, and energy loss in devices due to frictional resistance are often problematic.

In order to reduce the torque of the oil seal, it is preferable for oil to be held on the sliding surface. To satisfy this purpose, it is required to improve wettability with oil by increasing the roughness of the sliding surface. Here, in the case of a coating agent comprising, as a filler, only fluororesin particles having a low particle size of about 0.1 to 10 µm, which are conventionally used in coating agents, the surface energy of fluororesin is high, so that it is difficult to improve wettability with oil significantly. Further, because of its small particle size, it is also difficult to increase the roughness of the coating surface. For this reason, it is considered to use a coating agent containing a filler with a large particle size.

However, when a filler other than PTFE is used, abrasion resistance is lowered. When only PTFE is used, the amount of aggregation is large, resulting in deterioration of liquid stability and deterioration of the coating surface state due to aggregates.

The present applicant has previously proposed, in Patent Documents 1 and 2, surface-treating agents for vulcanized rubber comprising 10 to 160 parts by weight respectively of a wax having a softening point of 40 to 160° C. and a fluororesin, or 10 to 160 parts by weight respectively of a fluororesin and a polyethylene resin, based on 100 parts by weight of isocyanate group-containing 1,2-polybutadiene, wherein the surface-treating agents are prepared as organic solvent solutions. These surface-treating agents are supposed to be effectively applicable to oil seal and the like; however, further lower torque characteristics are demanded.

To address this problem, the present applicant has further proposed a coating agent for oil seal comprising 10 to 160 parts by weight of a fluororesin, silica, silicone resin, or polycarbonate filler having a particle size of 0.5 to 30, µm based on 100 parts by weight of isocyanate group-containing 1,2-polybutadiene, and being prepared as an organic solvent solution, wherein a contact angle between a substrate surface coated with the coating agent and engine oil is less than 35°. However, further improvements are required for the dispersibility of the PTFE filler, which is a fluororesin (Patent Document 3).

Here, a dispersant is added to improve the dispersibility of PTFE; however, if a large amount of dispersant is added, the strength of a film formed from the coating agent is reduced. Therefore, it was difficult to obtain a balance between the strength of the coating agent and its dispersibility.

PRIOR ART DOCUMENTS

Patent Documents

Patent Document 1: JP-B-3893985
Patent Document 2: JP-B-4873120
Patent Document 3: WO 2016/132982 A1

OUTLINE OF THE INVENTION

Problem to be Solved by the Invention

An object of the present invention is to provide a coating agent that can improve abrasion resistance while maintaining the roughness of a coating surface to which the coating agent is applied.

Means for Solving the Problem

The above object of the present invention can be achieved by a coating agent for oil seal comprising 10 to 90 parts by weight in total of fluororesin particles having a particle size of 2 µm or less and filler particles other than fluororesin particles having a particle size of 0.5 to 30 pun, and 10 to 40 parts by weight of a wax having a melting point of 40 to 160° C., based on 100 parts by weight of isocyanate group-containing 1,2-polybutadiene, and being prepared as an organic solvent solution, wherein the fluororesin particles are used at a ratio of 20 to 80 wt. % of the total filler amount.

Effect of the Invention

The combined use of fluororesin particles having a particle size of 2 µm or less and filler particles other than fluororesin particles having a particle size of 0.5 to 30 µm as the fillers to be contained in the coating agent exhibits an excellent effect of ensuring the roughness of a coating surface to which the coating agent is applied and being capable of improving abrasion resistance.

Further, when a selection is made so that the contact angle between the coated oil seal surface and engine oil is less than 35°, the wettability of the coating surface with oil can be improved, and the dynamic friction coefficient in oil can be reduced. Therefore, the excellent effect of achieving low torque characteristics for oil seal can be exhibited.

Embodiments for Carrying Out the Invention

As the isocyanate group-containing 1,2-polybutadiene, one having a molecular weight of about 1,000 to 3,000 in which an isocyanate group is added as a terminal group is used. This can be commercial products, such as Nisso TP-1001 produced by Nippon Soda Co., Ltd. (solution containing 50 wt. % of butyl acetate), which can be used as they are. Because an isocyanate group is added as a terminal group, reaction with the functional group on the surface of vulcanized rubber and the hydroxyl group-containing component occurs to cause adhesion and curing. The affinity and compatibility of the polybutadiene resin with rubber are superior to those of polyurethane resin that similarly reacts with an isocyanate group to achieve a higher molecular weight. Thus, the polybutadiene resin is characterized by excellent adhesion with rubber, particularly excellent friction and abrasion resistance characteristics.

As fillers, fluororesin particles having a particle size of 2 µm or less, preferably 0.5 µm or less, and filler particles other than fluororesin particles having a particle size of 0.5 to 30 µm, preferably 1 to 20 µm, are used in a total amount (total filler amount) of 10 to 90 parts by weight, preferably 40 to 80 parts by weight, based on 100 parts by weight of the isocyanate group-containing 1,2-polybutadiene. Further, the fluororesin particles are used at a rate of 20 to 80 wt. %, preferably 30 to 70 wt. %, of the total filler amount.

If the total filler amount is greater than this range, the adhesion with the rubber of the coating film and the friction and abrasion resistance characteristics are deteriorated. In addition, the flexibility of the coating film is impaired, and cracks occur in the coating film after curing. In contrast, if the total filler amount is less than this range, sliding properties are deteriorated. In addition, the surface roughness of the coating film is reduced, and the oil holding force is lowered to increase torque.

The fluororesin particles make it possible to form a coating film with excellent abrasion resistance. This effect can be exhibited even when a small amount of the fluororesin particles is compounded, and the durability of the coating agent can be improved. Moreover, the filler particles other than fluororesin particles can increase the roughness of the coating surface to improve the wettability with oil, and to reduce the friction coefficient in oil.

If the particle size of the fluororesin particles is larger than this range, aggregation of the fluororesin particles gets large, and it gets difficult to control the surface roughness of the coating film. In particular, if the size of the aggregates exceeds 30 μm, the roughness of the coating surface becomes greater, sealing properties are deteriorated to cause the leakage of oil. Furthermore, since the fluororesin particles have a high specific gravity, wherein the particle size is large, the effect of the dispersant cannot be exhibited. As a result, precipitation occurs, and the stability of the coating liquid is impaired.

If the particle size of the filler particles other than fluororesins gets becomes smaller than about 0.5 μm, the roughness of the coating surface becomes smaller, and the effect of holding oil cannot be maintained, eventually increasing the torque of the seal sliding surface. In contrast, if the particle size of the filler particles other than fluororesin particles is greater than about 30 μm, the roughness of the coating surface becomes greater, and sealing properties are deteriorated to cause the leakage of oil.

Moreover, if the rate of the fluororesin particles in the total fillers is less than about 20 wt. %, abrasion resistance is deteriorated. In contrast, if the fluororesin particles are used at a ratio greater than about 80 wt. %, the surface roughness of the coating film becomes smaller, the oil holding capability is lowered to increase oil repellency, and torque becomes higher. In addition, the contact angle to engine oil and the friction coefficient both tend to increase.

Examples of fluororesins include polytetrafluoroethylene [PTFE], tetrafluoroethylene/hexafluoropropylene copolymers, tetrafluoroethylene/perfluoro(alkyl vinyl ether) copolymers, polyvinylidene fluoride, polyvinyl fluoride, ethylene/tetrafluoroethylene copolymers, and the like.

Usable examples of such fluororesin particles include fluororesins classified to a particle size of about 0.1 to 2 μm obtained by bulk polymerization, suspension polymerization, solution polymerization, emulsion polymerization, or the like; fluoro dispersion liquids finely dispersed to about 0.1 to 2 μm by shearing and stirring obtained by suspension polymerization, solution polymerization, emulsion polymerization, or the like; fluororesins pulverized to about 2 μm or less by dry grinding or cool grinding after coagulation and drying obtained by the above polymerization methods.

Moreover, examples of filler particles other than fluororesin particles include particles of silica, silicone resin, silicone rubber, polycarbonate, urethane resin, acrylic resin, carbon black, polymethylsilsesquioxane (methyltrimethoxysilane polymer), and the like.

The particle size of these filler particles is measured according to JIS Z8825 corresponding to ISO 13320.

In the coating agent, a wax is further used at a ratio of 10 to 40 parts by weight, preferably 10 to 30 parts by weight, based on 100 parts by weight of the isocyanate group-containing 1,2-polybutadiene. If the wax is used at a ratio less than this range, abrasion resistance is lowered, and it gets difficult to control the precipitation of the fluororesin particles and the formation of precipitates of silicone resin. In contrast, if the wax is used at a ratio greater than this range, the coating agent is softened, and abrasion resistance is lowered.

The use of a wax improves the abrasion resistance of the coating film. In addition, mixing a wax, which has a low specific gravity, with the fluororesin particles can prevent aggregation and precipitation of the fluororesin particles.

As waxes, plant waxes, petroleum waxes, synthetic waxes, and the like having a melting point of about 40 to 160° C., preferably about 60 to 120° C. are used. Plant waxes include carnauba wax, candelilla wax, rice wax, and the like; petroleum waxes include paraffin wax, microcrystalline wax, and the like; and synthetic waxes include polyethylene wax, Fischer-Tropsch wax, fatty acid amide, various modified waxes, and the like. In general, commercially available waxes having a predetermined melting point can be used as they are.

If a wax having a melting point of about 40 to 160° C. is used, the wax is melted during the baking of the coating agent and is dispersed uniformly in the binder resin. If a wax having a melting point of higher than this range is used, the wax is not melted after the baking of the coating, and the wax part that forms a lump may cause a decrease in adhesion with the substrate. In contrast, if a wax having a melting point of lower than this range is used, the high temperature environment during use of the product may cause the wax component to be released, and the friction and abrasion resistance characteristics of the coating agent may be degraded.

The above components are prepared as a solution (dispersion) of an organic solvent, which is used as a coating agent for oil seal. Examples of organic solvents include toluene, xylene, ethyl acetate, butyl acetate, methyl ethyl ketone, methyl isobutyl ketone, and the like. Organic solvents that are commercially available in general can be used as they are. The amount of dilution with an organic solvent is suitably selected depending on a coating thickness and a coating method. The coating thickness is generally about 1 to 30 μm, preferably about 3 to 20 μm. If the coating thickness is less than this range, the entire rubber surface cannot be coated, and sliding properties and non-adhesiveness may be impaired. In contrast, if the coating thickness is greater than this range, the stiffness of the coating surface gets higher, and sealing properties and flexibility may be impaired. The coating thickness is preferably about 3 to 20 μm for use application such as seal parts.

In the present invention, the coating agent is finally prepared as an organic solvent solution, and the coating agent, in which the contact angle between the coated oil seal surface and engine oil, such as Engine Oil 0W-20, is less than 35° after coating of the oil seal surface, is used. If filler particles that make the contact angle after coating to become larger than this, oil is repelled, and the oil holding capability of the oil seal sliding surface is impaired. Thus, it gets difficult to achieve the desired low torque characteristics.

Examples of the rubber constituting oil seal that can be treated with such a coating agent include general rubber materials such as fluororubber, nitrile rubber, hydrogenated nitrile rubber, ethylene-propylene rubber, styrene-butadiene rubber, acrylic rubber, chloroprene rubber, butyl rubber, and natural rubber. Among them, rubber materials having little blooming of rubber compounding agents such as an antioxidant and oil, which are compounded in the rubber, to the rubber surface layer are preferably used. The compounding proportion of each component, the type of organic solvent, the amount of organic solvent, and the organic solvent mixing ratio are suitably selected depending on rubber materials and purposes.

Examples of the coating method of the coating agent on an oil seal surface include dipping, spraying, roll coater, flow coater, and the like, but it is not limited to these methods. In this case, it is preferable for dirt and the like on the rubber surface to be previously removed by washing or the like before the coating agent is applied. In particular, washing with water, a detergent, a solvent, etc., and drying are performed when materials bloomed and bled from the rubber are deposited on its surface.

After the coating agent is applied on the oil seal surface, heat treatment is performed at about 150 to 250° C. for about 10 minutes to 24 hours. If the heating temperature is lower than this range or the heating time is shorter than this range, the curing of the film and the adhesion with the rubber are insufficient, and non-adhesiveness and sliding properties are deteriorated. In contrast, if the heating temperature is higher than this range or the heating time is longer than this range, heat aging of the rubber occurs. Therefore, it is necessary to suitably set the heating temperature and heating time depending on the heat resistance of various rubbers.

Moreover, for items for which a reduction in the amount of outgassing is required, heat treatment, reduced pressure treatment, extraction treatment, etc., can be performed singly or in combination; however, heat treatment is economically the best. In order to reduce the amount of outgassing, it is preferable to perform heat treatment at about 150 to 250° C. for about 1 to 24 hours. In order to gasify low molecular weight components in the rubber and low molecular weight components contained in polybutadiene in the film, the higher the temperature and the longer the time, the more effective.

EXAMPLES

The following describes the present invention with reference to Examples.

| | |
|---|---|
| Isocyanate group-containing 1,2-polybutadiene | 200 parts by weight |
| (TP1001, produced by Nippon Soda Co., Ltd.; containing 50 wt. % of butyl acetate) | (100 parts by weight) |
| Polymethylsilsesquioxane particles (Tospearl 130, produced by Momentive; particle size: 3 μm) | 30 parts by weight |
| Polytetrafluoroethylene particles (Fluon 172J, produced by AGC Sei Chemical Co., Ltd.; particle size: 0.2 μm) | 30 parts by weight |
| Paraffin wax (melting point: 100° C.) | 20 parts by weight |
| Butyl acetate | (remnant) parts by weight |
| Total | 2000 parts by weight |

Each of the above components was mixed, and a coating agent solution comprising the butyl acetate solution was sprayed to vulcanized rubber with a thickness of 2 mm, to a thickness of 10 to 30 μm. After heat treatment at 200° C. for 10 hours, the contact angle, dynamic friction coefficient in oil, and abrasion resistance were measured or evaluated. In addition, the dispersibility of the coating liquid was also evaluated. Each of the parts by weight is represented by a part by weight of the solution, and the net part by weight of each component is shown in parentheses (the same applies to the following Examples and Comparative Examples).

Dispersibility: After the coating liquid was prepared, the precipitation speed of the fluororesin particles was visually confirmed. When no precipitation was observed after 10 minutes, this case was evaluated as ○, and when precipitation was observed within less than 10 minutes, this case was evaluated as X.

Contact angle: Using Drop Master 500 (produced by Kyowa Interface Science Co., Ltd.), the contact angle to Engine Oil 0W-20 was measured. A contact angle of less than 35° was evaluated as ○, and a contact angle of 35° or more was evaluated as X.

Dynamic friction coefficient in oil: Using a surface property tester (HEIDON TYPE14DR, produced by Shinto Scientific Co., Ltd.), reciprocation was carried out under the following conditions, and the dynamic friction coefficient on the forward side was measured. A dynamic friction coefficient of less than 0.2 was evaluated as ○, and a dynamic friction coefficient of 0.2 or more was evaluated as X.
Load: 50 g
Rate: 50 mm/min
Reciprocation distance: 50 mm
Indenter: a steel ball having a diameter of 10 mm
Oil type: Engine Oil 0W-20
Note: The dynamic friction coefficient in oil is an evaluation correlated with the real system evaluation of oil seal. When the dynamic friction coefficient in oil using the above test piece is low, the real system evaluation using oil seal is supposed to be excellent.

Abrasion resistance: Using Friction Player FPR-2000 (produced by Rhesca. Co., Ltd.), a SUS pin with a diameter of 0.4 mm was pressed against the surface of the coating film at 80° C. under a load of 300 g in a dry state, and rotated at a linear speed of 400 mm/sec. Then, the distance until the coating film was peeled off to expose the rubber was measured. A distance of 0.1 km or more was evaluated as ○, and a distance of less than 0.1 km was evaluated as X.

Example 2

In Example 1, the same amount (30 parts by weight) of amorphous silicon dioxide particles (Silica 6B, produced by Chuo Silica Co., Ltd.; particle size: 7 μm) was used in place of polymethylsilsesquioxane particle.

Example 3

In Example 1, the amount of polymethylsilsesquioxane particles was changed to 56 parts by weight, and the amount of polytetrafluoroethylene particles was changed to 24 parts by weight, respectively.

Example 4

In Example 1, the amount of polymethylsilsesquioxane particles was changed to 24 parts by weight, and the amount of polytetrafluoroethylene particles was changed to 56 parts by weight, respectively.

Comparative Example 1

In Example 1, the amount of polymethylsilsesquioxane particles was changed to 40 parts by weight, and no polytetrafluoroethylene particles were used.

Comparative Example 2

In Example 1, the amount of polymethylsilsesquioxane particles was changed to 45 parts by weight, and the amount of polytetrafluoroethylene particles was changed to 5 parts by weight, respectively.

Comparative Example 3

In Example 1, the amount of polymethylsilsesquioxane particles was changed to 10 parts by weight, and the amount of polytetrafluoroethylene particles was changed to 55 parts by weight, respectively.

Comparative Example 4

In Example 1, no polymethylsilsesquioxane particles were used, and the amount of polytetrafluoroethylene particles was changed to 40 parts by weight.

Comparative Example 5

In Example 1, the amount of polymethylsilsesquioxane particles was changed to 50 parts by weight, and the amount of polytetrafluoroethylene particles was changed to 50 parts by weight, respectively.

Comparative Example 6

In Example 1, neither polymethylsilsesquioxane particles nor polytetrafluoroethylene particles were used.

Comparative Example 7

In Example 1, as the paraffin wax, the same amount (20 parts by weight) of paraffin wax having a melting point of 35° C. was used.

Comparative Example 8

In Example 1, as the paraffin wax, the same amount (20 parts by weight) of paraffin wax having a melting point of 170° C. was used.

Comparative Example 9

In Example 1, the amount of paraffin wax was changed to 50 parts by weight.

Comparative Example 10

In Example 1, the amount of paraffin wax was changed to 60 parts by weight.

Comparative Example 11

In Example 1, 30 parts by weight of Fluon 150 J (particle size: 10 μm, produced by AGC Seimi Chemical Co., Ltd.) was used as the polytetrafluoroethylene particles, and no paraffin wax was used.

The results obtained in the above Examples and Comparative Examples are shown in the following Tables 1 and 2.

TABLE 1

| Measurement· evaluation item | Example 1 | Example 2 | Example 3 | Example 4 |
|---|---|---|---|---|
| Dispersibility of the fluororesin particles | ○ | ○ | ○ | ○ |
| Contact angle (°) | 21.3 ○ | 10.8 ○ | 19.4 ○ | 20.8 ○ |
| Dynamic friction coefficient in oil | 0.18 ○ | 0.15 ○ | 0.18 ○ | 0.19 ○ |
| Abrasion resistance | ○ | ○ | ○ | ○ |

TABLE 2

| Measurement·evaluation item | Comparative Example 1 | 2 | 3 | 4 | 5 | 6 | 7 | 8 | 9 | 10 | 11 |
|---|---|---|---|---|---|---|---|---|---|---|---|
| Dispersibility of the fluororesin particles | — | ○ | ○ | ○ | ○ | — | ○ | ○ | X | ○ | X |
| Contact angle (°) | 20.1 ○ | 24.5 ○ | 38.5 X | 39.0 X | 21.0 ○ | 40.2 X | 38.3 X | 36.2 X | 38.9 X | 15.0 ○ | 42.9 X |
| Dynamic friction coefficient in oil | 0.18 ○ | 0.15 ○ | 0.25 X | 0.32 X | 0.30 X | 0.23 X | 0.18 ○ | 0.30 X | 0.23 X | 0.40 X | 0.31 X |
| Abrasion resistance | X | X | ○ | ○ | X | X | X | ○ | X | X | ○ |

The above results demonstrate the followings.

(1) The coating agent obtained in each Example achieves low torque characteristics while maintaining excellent abrasion resistance.

(2) If a sufficient amount of the fluororesin particles is not used, abrasion resistance is deteriorated (Comparative Examples 1 and 2).

(3) If the rate of the fluororesin particles is high, oil is repelled, and the contact angle and the friction coefficient in oil increase (Comparative Examples 3 and 4).

(4) If the total filler amount is large, the surface roughness of the coating film increases, causing the convex portion to run out of oil. If the total filler amount is small, the surface roughness decreases. In either case, the friction and abrasion resistance effect is reduced (Comparative Examples 5 and 6).

(5) If the melting point of the wax is too low, the wax is released during baking, and abrasion resistance is deteriorated (Comparative Example 7).

(6) If the melting point of the wax is too high, the wax is not melted during baking, and the friction coefficient in oil increases (Comparative Example 8).

(7) If the amount of the wax is small, the dispersibility of the fluororesin particles is not ensured, and the surface roughness gets too large (Comparative Example 9).

(8) If the amount of the wax is large, the coating film is softened, and the friction and abrasion resistance characteristics are deteriorated (Comparative Example 10).

INDUSTRIAL APPLICABILITY

The coating agent according to the present invention improves abrasion resistance and achieves low torque characteristics, while maintaining excellent seal performance inherent in oil seal; therefore, the coating agent according to the present invention can be effectively used not only for oil seal, but also for prevention of adhesion, reduction of friction, prevention of abrasion, etc., of rubber parts, such as rubber rolls for copiers, rubber belts for copiers, industrial rubber hoses, industrial rubber belts, wipers, automobile weather strips, glass runs, and the like.

The invention claimed is:

1. A coating agent for oil seal comprising
polytetrafluoroethylene particles,
polymethylsilsesquioxane or silicon dioxide particles,
a paraffin wax, and
isocyanate group-containing 1,2-polybutadiene, and being prepared as an organic solvent solution, characterized by comprising
    60 to 80 parts by weight in total of polytetrafluoroethylene particles having a particle size of 0.5 µm or less and polymethylsilsesquioxane or silicon dioxide particles having a particle size of 3 to 7 µm, and
    10 to 30 parts by weight of the paraffin wax, based on 100 parts by weight of the isocyanate group-containing 1,2-polybutadiene,
wherein the polytetrafluoroethylene particles are used at a ratio of 30 to 70 wt. % of the total amount of the polytetrafluoroethylene particles, polymethylsilsesquioxane, and silicon dioxide particles.

2. An oil seal, which is subjected to coating treatment using the coating agent according to claim 1.

3. The oil seal according to claim 2, wherein after coating treatment, heat treatment is performed at 150 to 250° C. for 10 minutes to 24 hours.

4. The oil seal according to claim 2, wherein a contact angle between an oil seal surface and engine oil is less than 35°.

5. The oil seal according to claim 3, wherein a contact angle between an oil seal surface and engine oil is less than 35°.

* * * * *